F. M. MOODY.
LAWN MOWER.
APPLICATION FILED AUG. 7, 1911.
1,012,892.
Patented Dec. 26, 1911.
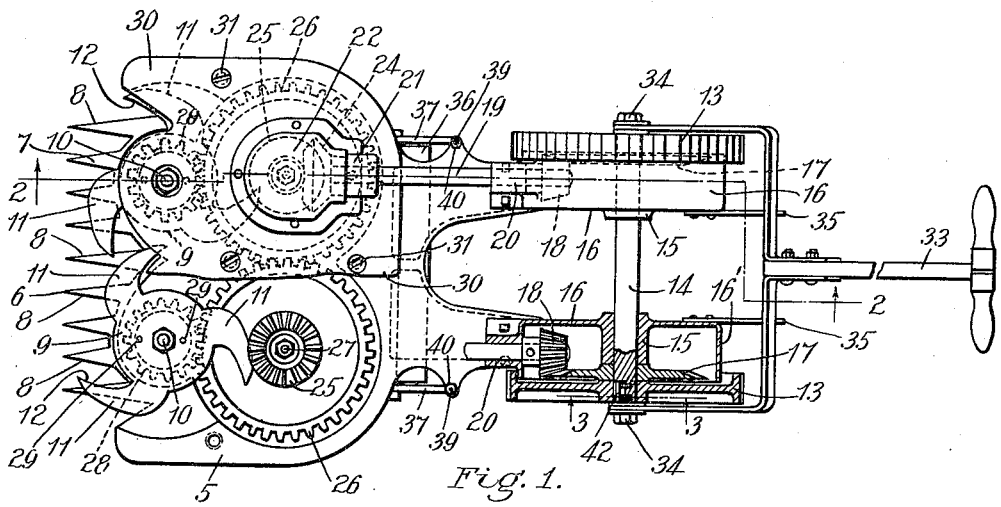
Fig. 1.
Fig. 3.
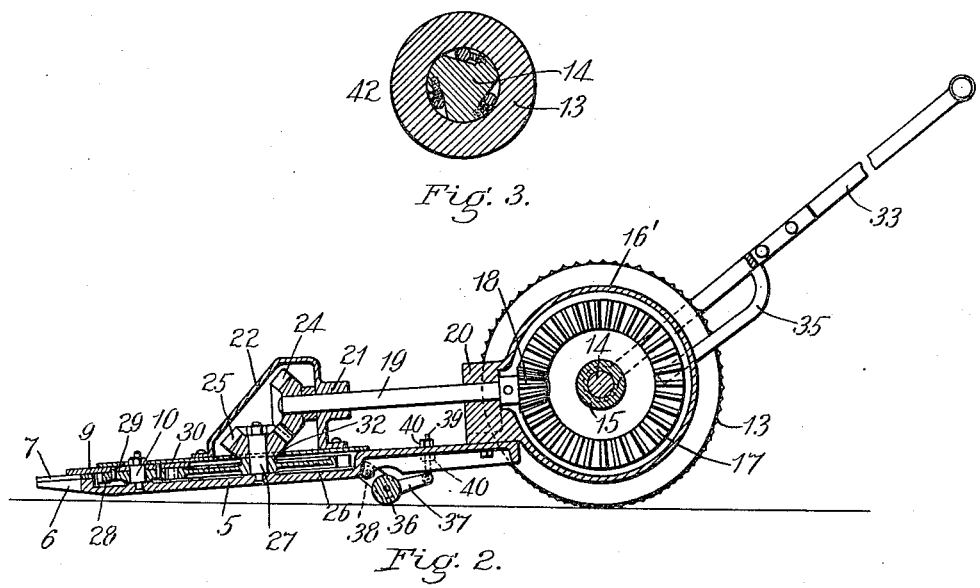
Fig. 2.
Witnesses.
Leonard A. Powell.
Franklin E. Low.
Inventor:
Fred M. Moody.
By his attorney,
COLUMBIA PLANOGRAPH CO., WASHINGTON, D. C.

UNITED STATES PATENT OFFICE.

FRED M. MOODY, OF WHITMAN, MASSACHUSETTS.

LAWN-MOWER.

1,012,892.  Specification of Letters Patent.  Patented Dec. 26, 1911.

Application filed August 7, 1911. Serial No. 642,839.

*To all whom it may concern:*

Be it known that I, FRED M. MOODY, a citizen of the United States, residing at Whitman, in the county of Plymouth and State of Massachusetts, have invented new and useful Improvements in Lawn-Mowers, of which the following is a specification.

This invention relates to lawn mowers and has for its object to provide a light, easy running lawn mower which may be manufactured at a very low cost, which is so constructed that the wearing parts may be readily removed to be sharpened or replaced by others, as the case requires, and which is especially adapted to be run at a high rate of speed to cut grass of any length and with very little wear to the cutters.

The invention consists in the combination and arrangement of parts set forth in the following specification and particularly pointed out in the claims thereof.

In the drawings embodying my invention I have shown a lawn mower comprising two rotary cutters and a driving wheel for each of said cutters, but I do not wish to confine myself to this number, as a greater number of cutters may be used in combination with one or more driving wheels without departing from the spirit of my invention.

Referring to the drawings: Figure 1 is a plan view of a lawn mower embodying my invention, with a portion of the gear covering broken away and other parts shown in section. Fig. 2 is a longitudinal sectional elevation of the same taken on line 2—2 of Fig. 1. Fig. 3 is a detail section of the friction clutch taken on line 3—3 of Fig. 1.

Like numerals refer to like parts throughout the several views of the drawings.

In the drawings, 5 is a frame provided at its front edge with a series of forwardly extending teeth 6, 6, each having secured upon the upper face thereof a plate 7, preferably of hardened steel, said plates constituting a stationary cutter blade. Cutters 9, 9, each rotatably mounted upon studs 10, 10, respectively, fast to said frame, are provided with a plurality of sickle-shaped blades 11, 11, the cutting edges 12, 12, arranged to travel in a path substantially parallel to the plane in which the cutting edges 8, 8 of the stationary cutter blade are located.

At the rear of the frame 5 and arranged to rotate upon an axis substantially at right angles to the axes of said cutters 9, 9 are driving wheels 13, 13 adapted, by means of a suitable power transmitting mechanism, to transmit a rotary motion to each of said cutters, said transmitting mechanism preferably constructed as follows: A shaft 14, on which the said wheels 13, 13 are mounted, is journaled in bearings 15, 15 in the brackets 16, extending rearwardly from the frame 5. A bevel gear 17 fast upon the shaft 14 meshes into a bevel pinion 18 secured to one end of a counter-shaft 19, said counter-shaft being, in turn, journaled to rotate in bearings 20 and 21, the bearing 20 adjacent to the bevel gear 17 being formed integral with the bracket 16, while the bearing 21 at the opposite end of said shaft 19 is formed upon the gear casing 22 which incloses the bevel gears 24 and 25, the gear 24 being secured to the counter-shaft 19 at the end opposite to that upon which the bevel pinion 18 is located. The bevel gear 25 meshes into the gear 24 and rotates in unison with a spur gear 26 upon a stud 27 fast to the frame 5, said gear 26, in turn, meshing into a pinion 28 rotatably mounted upon the stud 10 fast to said frame and upon which the cutter 9 rotates. Suitable locking means, preferably pins 29, are interposed between said cutter 9 and said pinion 28, whereby rotary motion is imparted from one to the other, but permitting the removal of said cutter from said stud without disturbing said pinion. When more than one rotary cutter is employed, it is desirable that they be placed very near together, so near, in fact, that in the rotation thereof the path of travel of the blades of one of said cutters will intersect the path described by the blades of any adjacent cutters and in order to prevent interference, the blades of one are so placed as to occupy the spaces between the teeth of the adjoining cutter. Independent relative motion therebetween is prevented by the intermeshing of the teeth of the gears 26, 26.

It is important that all gears, and as much of the rotary cutters as is possible, should be carefully covered to prevent grass and dirt from getting into the teeth and clogging them, thereby rendering them inoperative. To this end, the frame 5 is recessed sufficiently to receive each of the gears 26, 26, the pinions 28, 28 and portions of each of the cutters 9, 9. A plate 30 is then placed over said gears and secured to said frame by means of screws 31, 31. Openings are provided in said plate at 32, 32 to allow each of the bevel gears 25, 25, hereinbefore mentioned, to project therethrough, said holes being, in turn, covered by the gear casing 22.

In the operation of lawn mower, where two or more driving wheels serve to operate the cutters all of said driving wheels are mounted on one shaft, it is necessary that a differential device be interposed between said driving wheels and said shaft; otherwise, in turning a corner, the wheels on the outside of said turn would be apt to slide along the ground, digging up the grass and also requiring a great deal more power to operate the machine. For this purpose I preferably employ a clutch mechanism, such as 42, commonly called a "friction catch," and adapted to drive said shaft in one direction only, said friction catch being well known to those skilled in the art and requiring no further description. A handle 33 forked at its lower end is pivoted on the outer ends of the shaft 14 and is held thereon by means of nuts 34, 34. A stop 35 on the bracket 16 serves to retain said handle at the proper elevation. A guide-roll 36 is rotatable upon levers 37, 37 pivoted at 38 to lugs fast to the under side of the frame 5, the opposite ends of said levers being held in adjustable relation to said frame by means of the screw-threaded studs 39 and nuts 40.

The operation of my device is as follows: As the lawn mower is pushed along by means of the handle 33, the driving wheels 13, 13, provided with teeth upon their peripheries as is common to all driving wheels of lawn mowers, are rotated by contact with the ground and through the clutch mechanism 42 impart a rotary motion to the shaft 14. The bevel gear 17 which is fast upon said shaft and inclosed by the casing 16' formed upon the bracket 16 in turn transmits, through the bevel pinion 18, countershaft 19 and bevel gear 24 a rotary motion to the bevel gear 25 and spur gear 26 formed integral one with the other and rotatably mounted on the stud 27 fast to said frame. The gears 26, 26 mesh one with the other and impart a rotary motion to the cutters 9, 9 through the pinions 28 and pins 29.

The grass is guided into the path of the sickle-shaped blades 11 by the teeth 6 pointed at their outer extremities and gradually increasing in width as they extend backwardly and across the path of travel of said cutting blades, and finally terminate in a curve substantially concentric with said path. The sides of said teeth constitute the cutting edges 8, 8 of the stationary cutting blade against which the grass is cut by the rotary cutting blades 11, 11. The height at which the grass is cut may be varied by the adjustment of the guide-roll 36 toward or away from said frame 5 by means of the screw stud 39 and nuts 40.

Having thus described my invention, what I claim and desire by Letters Patent to secure is:

1. A lawn mower having, in combination, a stationary cutter blade provided with a series of cutting edges, a pair of rotary cutters each having a plurality of cutting edges coacting with the cutting edges of said stationary cutter blade, a pair of driving wheels mounted to rotate at the rear of said rotary cutters and within the path cut thereby, and mechanism consisting of a spur pinion fast to each of said rotary cutters respectively, a spur gear meshing into said spur pinions respectively, said spur gears meshing into each other and gearing connecting said driving wheels with said spur gears, whereby a relatively uniform rotary motion is imparted to each of said rotary cutters in opposite directions.

2. A lawn mower having, in combination, a stationary cutter blade provided with a series of cutting edges, rotary cutters each having a plurality of cutting edges coacting with the cutting edges of said stationary cutter blade in the cutting operation, the path of travel of the cutting edges of each of said rotary cutters intersecting the path described by the cutting edges of the rotary cutters adjacent thereto, all of the cutting edges of said rotary cutters lying substantially in the same plane in which the cutting edges of said stationary cutter blades are located, a rotary shaft, the axis of said shaft being substantially at right angles to the axes of said rotary cutters, driving wheels rotatably mounted upon said shaft, a clutch mechanism interposed between said shaft and each of said driving wheels, respectively, and mechanism adapted to transmit a rotary motion to each of said rotary cutters from said shaft, said mechanism also adapted to lock said rotary cutters against independent relative motion, said mechanism consisting of a spur pinion fast to each of said rotary cutters respectively, a spur gear meshing into each of said spur pinions respectively, said spur gears meshing into each other and an independent train of gearing operatively connecting each of said spur gears with said driving wheel shaft.

In testimony whereof I have hereunto set my hand in presence of two subscribing witnesses.

FRED M. MOODY.

Witnesses:
DANIEL A. ROLLINS,
LEONARD A. POWELL.

Copies of this patent may be obtained for five cents each, by addressing the "Commissioner of Patents, Washington, D. C."